(12) United States Patent
Bao et al.

(10) Patent No.: US 10,287,172 B2
(45) Date of Patent: May 14, 2019

(54) PREPARATION METHOD FOR BETA ZEOLITE

(71) Applicants: China University of Petroleum-Beijing, Beijing (CN); Beijing CUP Green Catalytic Technology Co., Ltd., Beijing (CN)

(72) Inventors: Xiaojun Bao, Beijing (CN); Yuanyuan Yue, Beijing (CN); Jinbiao Yang, Beijing (CN); Haiyan Liu, Beijing (CN); Pei Yuan, Beijing (CN)

(73) Assignees: CHINA UNIVERSITY OF PETROLEUM-BEIJING, Beijing (CN); BEIJING CUP GREEN CATALYTIC TECHNOLOGY CO., LTD., Beijing (CN)

( * ) Notice: Subject to any disclaimer, the term of this patent is extended or adjusted under 35 U.S.C. 154(b) by 161 days.

(21) Appl. No.: 15/527,969

(22) PCT Filed: Nov. 19, 2014

(86) PCT No.: PCT/CN2014/091553
§ 371 (c)(1),
(2) Date: Sep. 15, 2017

(87) PCT Pub. No.: WO2016/078016
PCT Pub. Date: May 26, 2016

(65) Prior Publication Data
US 2018/0029894 A1 Feb. 1, 2018

(51) Int. Cl.
*C01B 39/04* (2006.01)
*C01B 39/48* (2006.01)
*B01J 29/70* (2006.01)

(52) U.S. Cl.
CPC ............ *C01B 39/04* (2013.01); *B01J 29/7007* (2013.01); *C01B 39/48* (2013.01); *C01P 2002/90* (2013.01); *C01P 2004/62* (2013.01)

(58) Field of Classification Search
CPC ........ C01B 39/48; C01B 39/04; B01J 29/7007
See application file for complete search history.

(56) References Cited

U.S. PATENT DOCUMENTS

| 3,308,069 A | 3/1967 | Wadlinger et al. |
| 5,164,169 A | 11/1992 | Rubin |

FOREIGN PATENT DOCUMENTS

| CN | 1116227 C | 7/2003 |
| CN | 101108734 A | 1/2008 |

(Continued)

OTHER PUBLICATIONS

Robson, ed., Verified Synthesis of Zeolitic Materials, (2001) (Year: 2001).*

(Continued)

*Primary Examiner* — David M Brunsman
(74) *Attorney, Agent, or Firm* — Loza & Loza, LLP; Michael F. Fedrick

(57) ABSTRACT

The present invention provides a preparation method of Beta molecular sieve, comprising: activating a mineral having low silica-to-alumina ratio and a mineral having high silica-to-alumina ratio, respectively, wherein the mineral having low silica-to-alumina ratio is activated via a sub-molten salt medium, and the mineral having high silica-to-alumina ratio is activated via means of high-temperature calcination; mixing the activated minerals with sodium chloride, potassium chloride, water and template agent for hydrothermal crystallization, wherein the charged amounts of the raw materials satisfies a molar ratio of: 0.03-0.18 $Na_2O$: 0.01-0.03 $K_2O$: 0.1-0.4 $(TEA)_2O$: 1 $SiO_2$: 0.01-0.5 $Al_2O_3$: 12-40 $H_2O$; cooling the crystallized product and removing the (Continued)

mother liquor by filtration, washing the resulting filter cake with water to neutral and drying it to obtain the Beta molecular sieve.

8 Claims, 5 Drawing Sheets

(56) References Cited

FOREIGN PATENT DOCUMENTS

| CN | 101439863 | A | | 5/2009 | | |
|---|---|---|---|---|---|---|
| CN | 101239321 | A | | 4/2010 | | |
| CN | 101723398 | A | | 6/2010 | | |
| CN | 102923728 | A | | 2/2013 | | |
| CN | 103570036 | A | | 2/2014 | | |
| CN | 103771452 | A | * | 5/2014 | ............ | C01B 39/48 |
| CN | 107416859 | A | * | 4/2017 | ............ | C01B 39/46 |
| EP | 0187522 | A2 | | 7/1986 | | |

OTHER PUBLICATIONS

Landau et al., "Colloidal Nanocrystals of Zeolite β Stabilized in Alumina Matrix." American Chemical Society, Chem Mater. 1999, 11(8): 2030-2037.
PCT/CN2014/091553. International Search Report (dated Aug. 25, 2015).

\* cited by examiner

PREPARATION METHOD FOR BETA ZEOLITE

This application is a 371 filing of PCT/CN2014/091553, filed Nov. 19, 2014.

FIELD OF TECHNOLOGY

The present invention relates to the field of synthesis of molecular sieves, and particularly to a preparation method of a Beta molecular sieve, wherein mainly the natural mineral provides all of the silica and alumina sources required for the synthesis of the Beta molecular sieve.

BACKGROUND ART

Beta molecular sieve is a molecular sieve having a high silica-to-alumina ratio is firstly synthesized in 1967 by Mobil Corporation, US using a classic hydrothermal crystallization method (U.S. Pat. No. 3,308,069). The unique structural characteristic of twelve-membered ring topology gives the Beta molecular sieve with unique catalytic performance and thus it is widely used in the petrochemical industry. It has similar pore size and adsorption capacity to the faujasite, but has a higher silica-to-alumina ratio, more excellent thermal and hydrothermal stability and stronger acidity compared with the faujasite. It can be used as a very effective active component for the preparation of catalysts in the processes of hydrocracking, isomerization, alkylation, catalytic cracking and the like. However, the high cost of synthesis has been one of the factors that limit the practical industrial application of Beta molecular sieve, so reducing the cost of synthesis has always been a key issue for the researchers in the field.

CN101439863A discloses a preparation method of Beta molecular sieve, in which a reaction mixture composed of solid alumino-silica gel, tetraethylammonium hydroxide, sodium hydroxide, a mother liquor of a synthesis product and a filtrate of the synthetic product after heat treatment with ammonia water is used as a raw material, wherein the ammonia water-treated filtrate of the synthetic product is obtained by filtering 2 to 5 wt. % of the ammonia water-treated product, Beta molecular sieve, at 70 to 100° C. for 0.5 to 4 h, and then the reaction mixture is hydrothermal crystallized at 120 to 170° C. for 3 to 7 days to produce the Beta molecular sieve. This preparation process greatly reduces the amount of tetraethylammonium hydroxide to reduce the production cost.

CN1116227C discloses the synthesis of a Beta molecular sieve by using an alkali metal ion-free system. Although this method omits the process of ammonium exchange, simplifies the process route to a certain extent and even improves the yield of the product, the amount of organic amine is increased significantly, which does not reduce the cost of production, but leads to a significant increase in the total cost. Also, exchange processes are often necessary to remove the residual metal ion impurities in the product molecular sieve, otherwise its catalytic performance would be seriously influenced, so the effect of reducing the cost cannot be realized in terms of process steps.

EP187522 discloses a method for the synthesis of Beta molecular sieve by uniformly mixing $Na_2O$, $SiO_2$, $Al_2O_3$ and a solid powder of Beta molecular sieve seed crystals into an aqueous solution of tetraethylammonium ion ($TEA^+$), and producing the Beta molecular sieve via crystallization without external addition of water. The method reduces the production cost of the Beta molecular sieve and improves the yield to a certain extent, but the time for synthesis is still as long as up to 6 to 10 days, which is unacceptable for industrial production, and the relative crystallinity of the product is only 50 to 80%.

U.S. Pat. No. 5,164,169 discloses a synthesis technique of a large crystals of Beta molecular sieve in which the $SiO_2/Al_2O_3$ molar ratio in the reaction system is generally greater than 70 and seed crystals of the large crystals of Beta molecular sieve are required to be externally added. Also, a large amount of organic nitrides is used with the use of a chelating agent, and thus the purpose of reducing the production cost is not achieved.

Landau (Chemistry of Materials, 1999, 11(8): 2030-2037) et al. synthesized Beta molecular sieve aggregates with particle size of 60 to 100 nm at low sodium ion content and a high concentration by using colloidal silica as a silica source and aluminum isopropoxide as an alumina source, and found that it was established by aggregation of smaller primary particles (10 to 20 nm).

All technical routes of Beta molecular sieve synthesis in prior art as described above uses inorganic chemical products as raw materials. These inorganic chemical products are mostly produced through complex reaction and separation processes from natural minerals, with long production process routes and high energy consumptions; and there is serious pollution emission in most of the processes, resulting in high production costs of these inorganic chemical products, and the production process are not environmentally friendly. The use of these products as raw materials for synthesizing the Beta molecular sieve would inevitably make the production cost at a high level. In order to solve the above problems, in recent years, the development of some technical routes in which natural clay minerals is used as the raw material to synthesize molecular sieves can reduce the cost for the molecular sieve synthesis to a certain extent.

CN101723398A discloses a method for synthesizing small crystals of Beta molecular sieve with montmorillonite, in which montmorillonite is subjected to acid treatment and high-temperature calcination. The acid-treated montmorillonite is heated and immersed in a template solution and serves as a raw material to provide all or part of the alumina source, and then is crystallized by adding a silica source and replenishing the alumina source, alkalis, water, an accelerator and a template agent to produce the small crystals of Beta molecular sieve under hydrothermal conditions.

CN101239321A discloses a montmorillonite/Beta molecular sieve composite and a method for producing the same. In this method, the montmorillonite/Beta molecular sieve composite was prepared by homogeneously mixing montmorillonite with Beta molecular sieve gel and then performing in situ crystallization and filtering, washing and drying. The process of this method is simple and the product is easy to be separated. The produced molecular sieve composite has good hydrothermal stability, but still needs to add silica and alumina sources in the form of inorganic chemical products.

Although the research of Beta molecular sieve synthesis by using natural clay minerals as raw materials has been paid attention, most of them still need additional silica and alumina sources in the form of inorganic chemical products. Only parts of silica and alumina in the minerals are used, and a certain amount of silica source or alumina source as inorganic chemical products are still required to be added to adjust the silica-to-alumina ratio, such that the silica and alumina sources as inorganic chemical products are not completely avoided. The technique of producing Beta molecular sieve having adjustable silica-to-alumina ratio from natural minerals as entire raw materials, without externally adding the silica and alumina sources as inorganic chemical products, has not been reported.

In recent years, with the development of green chemistry and chemical engineering, the use of non-toxic harmless raw materials, improvement of the utilization of raw materials, decrease of the energy consumption of the production process and reduction of pollution emissions have become the focus of new chemical process research and development. Beta molecular sieve is a widely used molecular sieve material in the field of petrochemical industry. If the silica and alumina sources in natural minerals can be utilized sufficiently and the silica-to-alumina ratio in the synthesis system can be adjusted without using inorganic chemical products as additional silica and alumina sources to produce the Beta molecular sieve, not only the source of raw materials is more extensive, but also can greatly shorten the synthesis route of raw materials to molecular sieves, significantly reduce energy consumption, material consumption and pollution emissions in the molecular sieve production process, and significantly reduce production cost, thereby providing a new green synthesis route for the synthesis of Beta molecular sieve, having broad prospects for development. However, the requirements for the synthesis condition of Beta molecular sieve is relatively high, and it is difficult to synthesize pure Beta molecular sieve by using chemical reagents in the prior art. By searching, no technical report about synthesis of the Beta molecular sieve having adjustable silica-to-alumina ratio by using natural minerals containing impurities as all of the silica and alumina sources was found.

SUMMARY OF THE INVENTION

In view of the current situation that the production cost of Beta molecular sieve synthesis in prior art remains high, the object of the present invention is to provide a method for preparing Beta molecular sieve by using natural clay minerals to provide all of the silica and alumina sources, in order to reduce the energy consumption, material consumption and reduce the pollution emissions.

In the preparation method of Beta molecular sieve provided by the present invention, natural clay minerals are mainly used to provide all of the silica and alumina sources needed for the synthesis of the molecular sieve, and then are activated and crystallized under a hydrothermal condition to synthesize the Beta molecular sieve. The route of the preparation process provided by the present invention can not only greatly reduce the cost for the synthesis of molecular sieve, but also significantly improve the environmental friendliness of the synthesis process, and the obtained molecular sieve has excellent physical and chemical properties.

In particular, the preparation method of Beta molecular sieve provided by the present invention comprises the following steps:

(1) activation of minerals: activating a mineral having low silica-to-alumina ratio and a mineral having high silica-to-alumina ratio, respectively, wherein the mineral having low silica-to-alumina ratio is activated via a sub-molten salt medium, and the mineral having high silica-to-alumina ratio is subjected to thermal activation treatment by means of high-temperature calcination;

(2) crystallization: mixing the mineral having low silica-to-alumina ratio and the mineral having high silica-to-alumina ratio, which have been activated in Step (1), with sodium chloride, potassium chloride, water and a template agent for hydrothermal crystallization, and controlling charged amounts of the respective raw materials such that the molar ratio satisfies: 0.03-0.18 $Na_2O$:0.01-0.03 $K_2O$:0.1-0.4 $(TEA)_2O$:1 $SiO_2$:0.01-0.5 $Al_2O_3$:12-40 $H_2O$; cooling the crystallized product, removing the mother liquor by filtration, washing the resulting filter cake with water to neutral and drying it to obtain the Beta molecular sieve.

According to a specific embodiment of the present invention, in the preparation method of Beta molecular sieve of the present invention, the "mineral having low silica-to-alumina ratio" and the "mineral having high silica-to-alumina ratio" are terms that are customary for those skilled in the art and their meanings are well known to those skilled in the art; in the present invention, it is preferred that the mineral having low silica-to-alumina ratio has a silica-to-alumina molar ratio of 10 or less, and the mineral having high silica-to-alumina ratio has a silica-to-alumina molar ratio of 30 or more. According to a specific embodiment of the present invention, the mineral having low silica-to-alumina ratio is kaolin and/or rectorite; and the mineral having high silica-to-alumina ratio is diatomite and/or white carbon black.

According to a specific embodiment of the present invention, in the preparation method of Beta molecular sieve of the present invention, the specific procedure of the activation of the mineral having low silica-to-alumina ratio with a sub-molten salt medium is as follows: mixing uniformly the mineral having low silica-to-alumina ratio with an alkali metal hydroxide and water prior to drying, wherein, preferably, the alkali metal hydroxide is sodium hydroxide, and sodium hydroxide and water form a sodium hydroxide-$H_2O$ sub-molten salt system; more preferably, the mass ratio of the mineral having low silica-to-alumina ratio to the total weight of sodium hydroxide and water is 1:1-10, and the mass ratio of sodium hydroxide to water is from 2:1 to 1:5. According to a specific embodiment of the present invention, the mineral having low silica-to-alumina ratio has an activation temperature by sub-molten salt of from 100 to 400° C. That is, the mineral having low silica-to-alumina ratio is mixed uniformly with alkali metal hydroxide and water, and then dried at 100 to 400° C.

According to a specific embodiment of the present invention, in the preparation method of Beta molecular sieve of the present invention, during the process of thermal activation treatment of the mineral having high silica-to-alumina ratio, the calcination temperature is from 600 to 1000° C., and the calcination time is preferably from 1 to 10 h.

According to a specific embodiment of the present invention, in the preparation method of Beta molecular sieve of the present invention, in Step (2), it is also preferably that the charged amounts can be controlled such that the molar ratio satisfies: 0.03-0.18 $Na_2O$:0.01-0.03 $K_2O$:0.1-0.4 $(TEA)_2O$:1 $SiO_2$:0.01-0.05 $Al_2O_3$:12-40 $H_2O$.

In the present invention, the addition ratio between the mineral having low silica-to-alumina ratio and the mineral having high silica-to-alumina ratio should satisfy the molar ratio of 1 $SiO_2$:0.01 -0.5 $Al_2O_3$, preferably 1 $SiO_2$:0.01-0.05 $Al_2O_3$. Under the conditions of satisfying the above molar ratios, the amount ratio between the mineral having low silica-to-alumina ratio and the mineral having high silica-to-alumina ratio can be calculated based on the silica-to-alumina ratios of the two selected minerals, wherein the mineral having low silica-to-alumina ratio and the mineral having high silica-to-alumina ratio can be mixed properly.

According to a specific embodiment of the present invention, in the preparation method of Beta molecular sieve of the present invention, the template agent in Step (2) is tetraethylammonium hydroxide, tetraethylammonium bromide or a combination thereof, wherein a more preferred template agent is tetraethylammonium hydroxide.

According to a specific embodiment of the present invention, in the preparation method of Beta molecular sieve of the present invention, the crystallization in Step (2) is carried out at 130 to 160° C., wherein the crystallization time is preferably 24 to 72 h.

The technical solution of the present invention is achieved by exploration through a large number of experiments, and the Beta molecular sieve is successfully synthesized by using natural minerals having low silica-to-alumina ratio and high silica-to-alumina ratio, which contain impurities, as the entire silica and alumina sources for synthesis of Beta molecular sieve. The preparation method provided by the invention has advantages such as simple process, easily available raw materials, and controllable silica-to-alumina molar ratio of products. Small crystals of Beta molecular sieve having varied silica-to-alumina ratios and crystallinities can be obtained by using the method of the present invention, and an obtained Beta molecular sieve has a silica-to-alumina molar ratio of 2.0 to 78.0, a crystallinity of 70 to 100% relative to a Beta molecular sieve which is synthesized by using pure inorganic chemical products as raw materials, and a grain size of 100 to 600 nm. The molecular sieve of the present invention has an X-ray diffraction (XRD) characteristic peak of Beta molecular sieve. Different types of modified Beta molecular sieves such as HBeta, P-HBeta and Re-HBeta can be prepared by ion-modifying the Beta molecular sieve with ammonium chloride, ammonium hydrogen phosphate, rare earth metals and the like, and have almost the same physicochemical properties as the same type of molecular sieves which are synthesized by using pure inorganic chemical reagents as the silica and alumina sources.

In conclusion, the present invention provides a preparation method of Beta molecular sieve, wherein mainly the natural minerals provide all of the silica and alumina sources required for the synthesis of the Beta molecular sieve, and there is no need to add other forms of chemical silica and alumina sources, thereby broadening the application fields of natural minerals and sources of raw materials for synthesizing the molecular sieve.

DETAILED DESCRIPTION OF PREFERRED EMBODIMENTS

The present invention will now be described, by way of example, with reference to the following detailed description of the embodiments and the beneficial effects of the present invention, which are intended to assist the reader in a better understanding of the spirit and features of the invention and are not to be construed as limiting the scope of the invention.

The relative crystallinity described in the examples is the ratio of the characteristic peak areas of the 2θ angle at 21.5° in the XRD spectrum between the resulting product and the molecular sieve standard sample according to ASTM D 3906-03, expressed as a percentage. The standard sample is a Beta molecular sieve (manufactured by Nankai University Catalyst Factory, which has a silica-to-alumina molar ratio of 40) synthesized by using conventional chemical reagents as raw materials, and its crystallinity is defined as 100%.

The silica-to-alumina ratio of the product was characterized by an X-ray fluorescence (XRF) method using Rigaku ZSX-100e4580 Type X-ray fluorescence spectrometer. The silica-to-alumina ratio of the molecular sieve described in the present invention refers to the molar ratio of $SiO_2$ to $Al_2O_3$.

Selection of minerals in Examples: The diatomite, kaolin and rectorite used are commercially available. The main components of diatomite are: $SiO_2$ with a content of 96.2 wt. %, and $Al_2O_3$ with a content of 2.13 wt. %; the main components of rectorite are: $SiO_2$ with a content of 43.2 wt. %, and $Al_2O_3$ with a content of 37.2 wt. %; the main components of kaolin are: $SiO_2$ with a content of 50.5 wt. %, and $Al_2O_3$ with a content of 44.6 wt. %.

EXAMPLE 1

Activation of minerals: 50.00 g of a diatomite powder was weighed and calcined at 800° C. for 4 h for use. 12.00 g of a rectorite powder was weighed and mixed homogeneously with 18.00 g of solid sodium hydroxide, and 90.00 g of deionized water was added, then dried at 250° C. for use.

Figure 1:
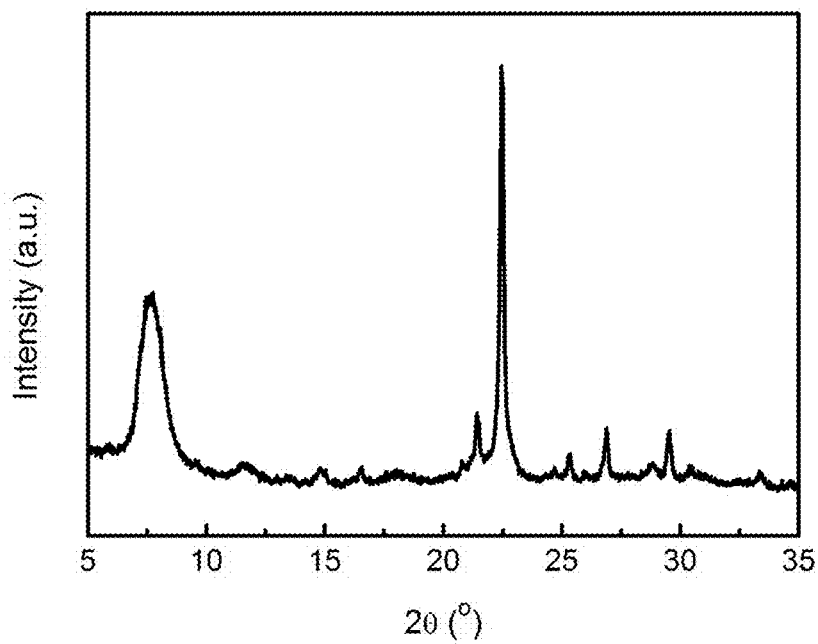
FIG. 1 is an XRD spectrum of the Beta molecular sieve obtained in Example 1 of the present invention.
Figure 2:
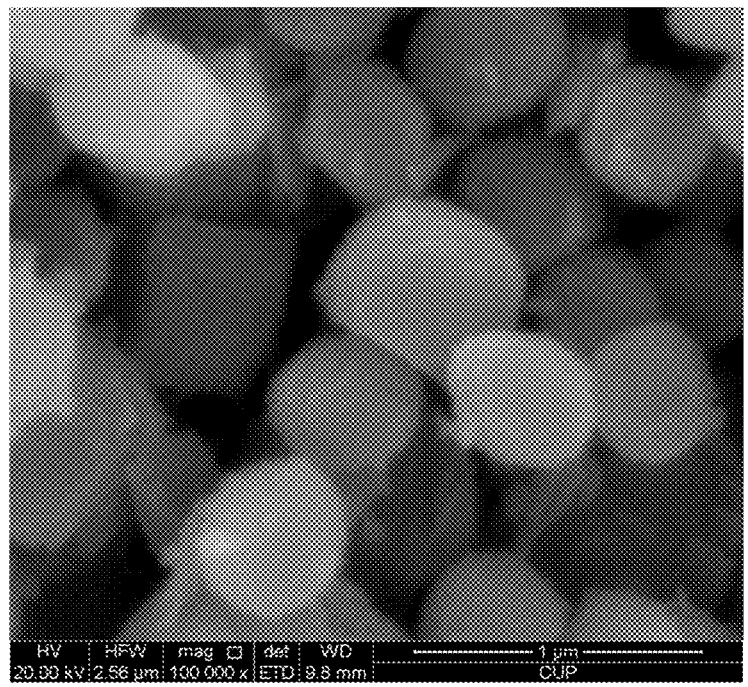
FIG. 2 is a scanning electron microscope (SEM) image magnified by 100,000 times of the Beta molecular sieve obtained in Example 1 of the present invention.

Preparation of the molecular sieve: 9.00 g of the calcined diatomite powder was weighed, and 43.00 g of tetraethylammonium hydroxide (mass fraction of 25%, the same below), 7.70 g of deionized water, 0.03 g of sodium chloride, 0.43 g of potassium chloride, and 0.73 g of the activated rectorite powder were added, such that the molar ratio satisfies: 0.04 $Na_2O$:0.02 $K_2O$:0.25 $(TEA)_2O$:1 $SiO_2$:0.02 $Al_2O_3$:15 $H_2O$. After mixing uniformly, this mixture was poured into a Teflon-lined stainless steel crystallization vessel, heated to 140° C., and left to crystallization for 72 h. After the completion of crystallization, the mixture was cooled and the mother liquor was removed by filtration, and the resultant was washed to neutral, and dried at 120° C., to obtain a crystallized product. The physical phase of the product was identified by XRD characterization as a Beta molecular sieve. In the product, the Beta molecular sieve had a relative crystallinity of 99%, a grain size of 400 to 600 nm, a silica-to-alumina ratio of 48.0, an XRD spectrum as shown in FIG. 1, and a SEM image as shown in FIG. 2.

EXAMPLE 2

Activation of minerals: 50.00 g of a diatomite powder was weighed and calcined at 600° C. for 8 h for use. 12.00 g of a rectorite powder was weighed and mixed homogeneously with 24.00 g of solid sodium hydroxide, and 60.00 g of deionized water was added, then dried at 200° C. for use.

Figure 3:
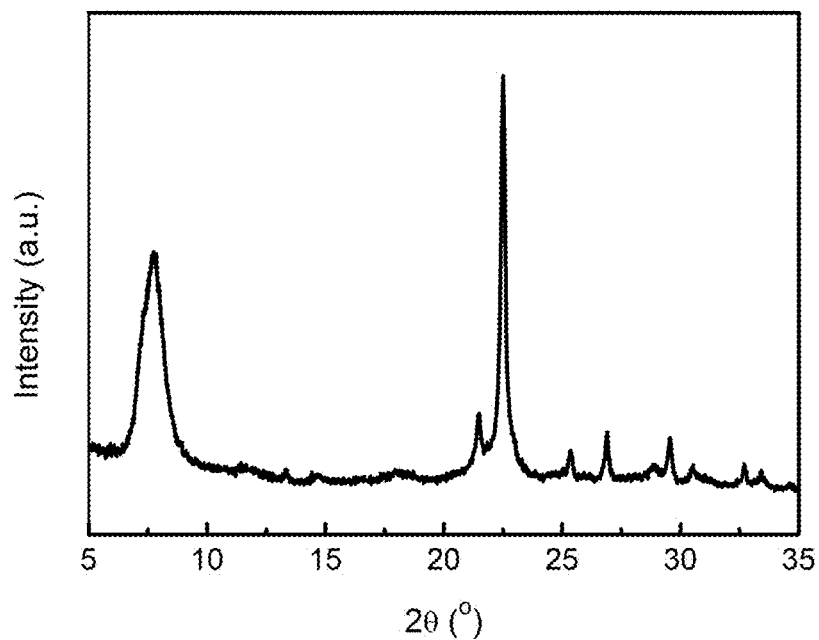
FIG. 3 is an XRD spectrum of the Beta molecular sieve obtained in Example 2 of the present invention.
Figure 4:
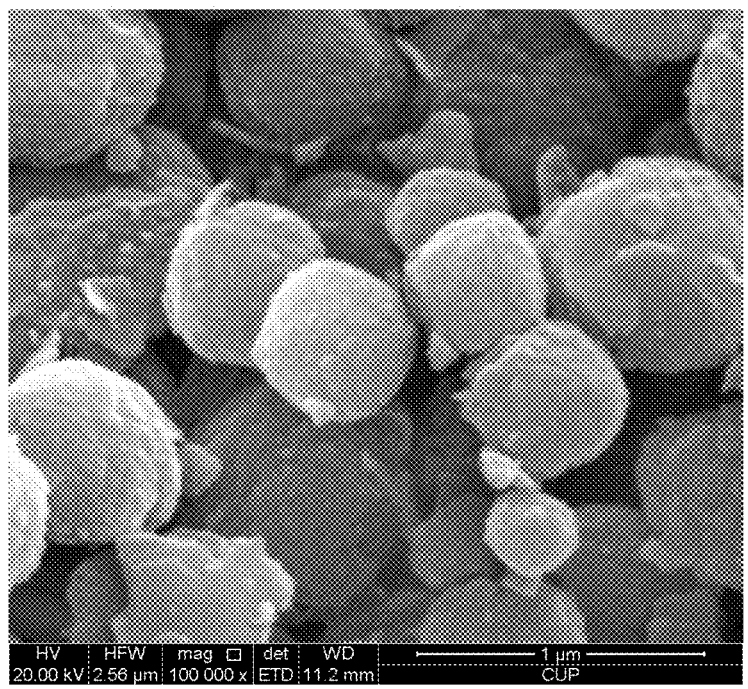
FIG. 4 is a scanning electron microscope (SEM) image magnified by 100,000 times of the Beta molecular sieve obtained in Example 2 of the present invention.

Preparation of the molecular sieve: 9.00 g of the calcined diatomite powder was weighed, and 60.20 g of tetraethylammonium hydroxide, 48.21 g of deionized water, 0.03 g of sodium chloride, 0.65 g of potassium chloride, and 0.86 g of the activated rectorite powder were added, such that the molar ratio satisfies: 0.05 $Na_2O$:0.03 $K_2O$:0.35 $(TEA)_2O$:1 $SiO_2$:0.02 $Al_2O_3$:35 $H_2O$. After mixing uniformly, this mixture was poured into a Teflon-lined stainless steel crystallization vessel, heated to 150° C., and left to crystallization for 24 h. After the completion of crystallization, the mixture was cooled and the mother liquor was removed by filtration, and the resultant was washed to neutral, and dried at 120° C., to obtain a crystallized product. The physical phase of the product was identified by XRD characterization as a Beta molecular sieve. In the product, the Beta molecular sieve had a relative crystallinity of 90%, a grain size of 200 to 600 nm, a silica-to-alumina ratio of 47.5, a XRD spectrum as shown in FIG. 3, and a SEM image as shown in FIG. 4.

EXAMPLE 3

Activation of minerals: 50.00 g of a diatomite powder was weighed and calcined at 950° C. for 2 h for use. 12.00 g of a rectorite powder was weighed and mixed homogeneously with 12.00 g of solid sodium hydroxide, and 6.00 g of deionized water was added, then dried at 350° C. for use.

Figure 5:
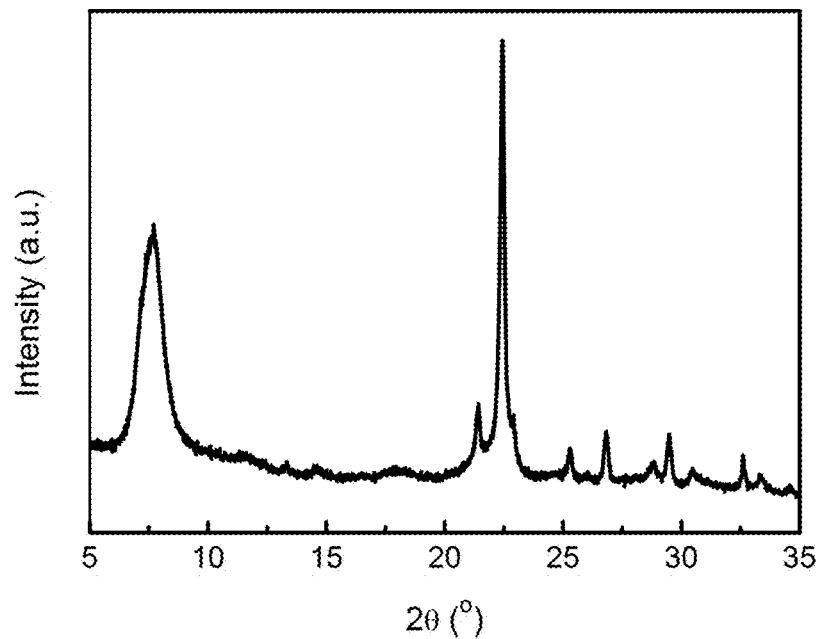
FIG. 5 is an XRD spectrum of the Beta molecular sieve obtained in Example 3 of the present invention.
Figure 6:
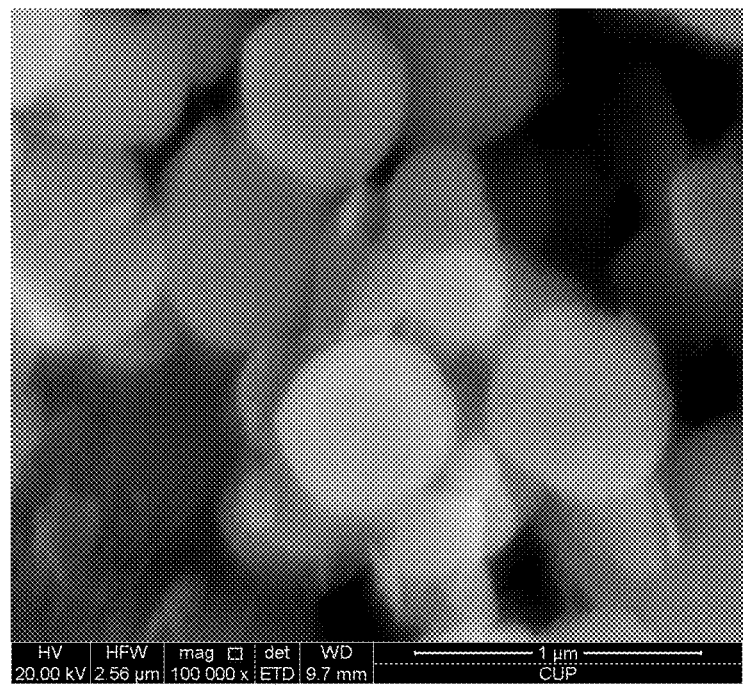
FIG. 6 is a scanning electron microscope (SEM) image magnified by 100,000 times of the Beta molecular sieve obtained in Example 3 of the present invention.

Preparation of the molecular sieve: 9.00 g of the calcined diatomite powder was weighed, and 25.80 g of tetraethylammonium hydroxide, 44.65 g of deionized water, 0.60 g of sodium chloride, 0.33 g of potassium chloride, and 0.57 g of the activated rectorite powder were added, such that the molar ratio satisfies: 0.06 $Na_2O$:0.015 $K_2O$:0.15 $(TEA)_2O$:1 $SiO_2$:0.02 $Al_2O_3$:24 $H_2O$. After mixing uniformly, this mixture was poured into a Teflon-lined stainless steel crystallization vessel, heated to 130° C., and left to crystallization for 60 h. After the completion of crystallization, the mixture was cooled and the mother liquor was removed by filtration, and the resultant was washed to neutral, and dried at 120° C., to obtain a crystallized product. As measured by XRD, the physical phase of the product belongs to Beta molecular sieve. In the product, the Beta molecular sieve had a relative crystallinity of 85%, a grain size of 300 to 600 nm, a silica-to-alumina ratio of 48.5, an XRD spectrum as shown in FIG. 5, and a SEM image as shown in FIG. 6.

EXAMPLE 4

Activation of minerals: 50.00 g of a diatomite powder was weighed and calcined at 950° C. for 2 h for use. 12.00 g of a kaolin powder was weighed and mixed homogeneously with 18.00 g of solid sodium hydroxide, and 42.00 g of deionized water was added, then dried at 300° C. for use.

Figure 7:
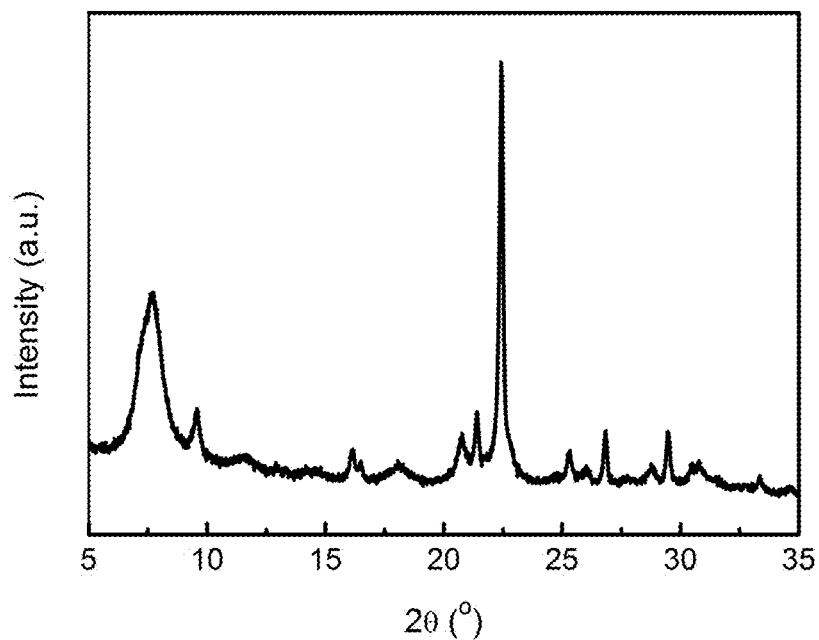
FIG. 7 is an XRD spectrum of the Beta molecular sieve obtained in Example 4 of the present invention.
Figure 8:
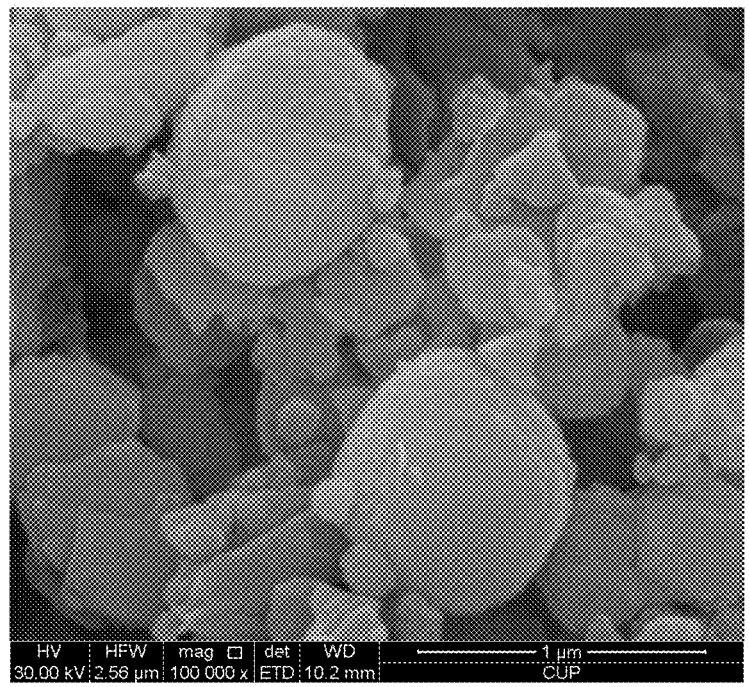
FIG. 8 is a scanning electron microscope (SEM) image magnified by 100,000 times of the Beta molecular sieve obtained in Example 4 of the present invention.

Preparation of the molecular sieve: 9.00 g of the calcined diatomite powder was weighed, and 43.76 g of tetraethylammonium hydroxide, 20.64 g of deionized water, 0.12 g of sodium chloride, 0.33 g of potassium chloride, and 1.25 g of the activated kaolin powder were added, such that the molar ratio satisfies: 0.07 $Na_2O$:0.015 $K_2O$:0.25 $(TEA)_2O$:1 $SiO_2$: 0.027 $Al_2O_3$:20 $H_2O$. After mixing uniformly, this mixture was poured into a Teflon-lined stainless steel crystallization vessel, heated to 140° C., and left to crystallization for 48 h. After the completion of crystallization, the mixture was cooled and the mother liquor was removed by filtration, and the resultant was washed to neutral, and dried at 120° C., to obtain a crystallized product. The physical phase of the product was identified by XRD characterization as a Beta molecular sieve. In the product, the Beta molecular sieve had a relative crystallinity of 75%, a grain size of 100 to 500 nm, a silica-to-alumina ratio of 35, an XRD spectrum as shown in FIG. 7, and a SEM image as shown in FIG. 8.

EXAMPLE 5

Activation of minerals: 50.00 g of a diatomite powder was weighed and calcined at 800° C. for 6 h for use. 12.00 g of a kaolin powder was weighed and mixed homogeneously with 18.00 g of solid sodium hydroxide, and 54.00 g of deionized water was added, then dried at 300° C. for use.

Figure 9:
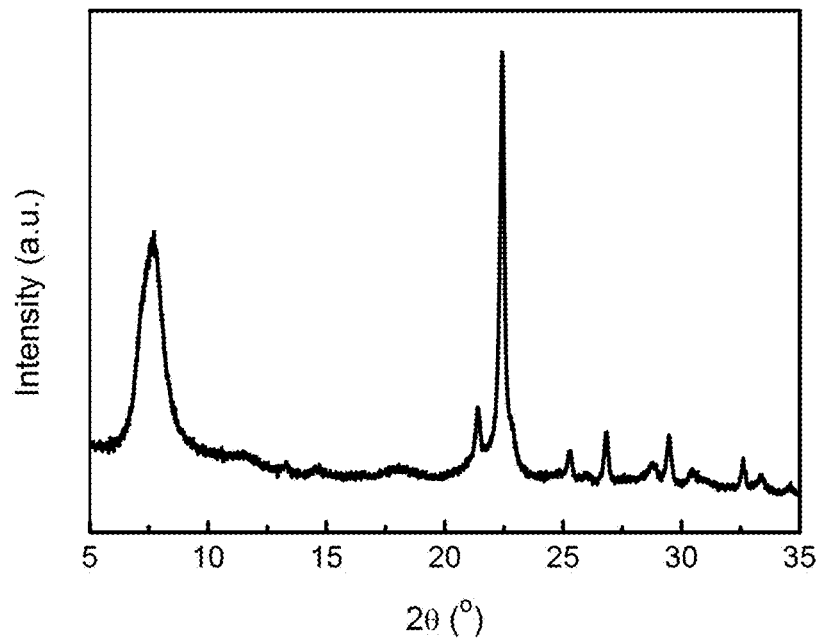
FIG. 9 is an XRD spectrum of the Beta molecular sieve obtained in Example 5 of the present invention.
Figure 10:
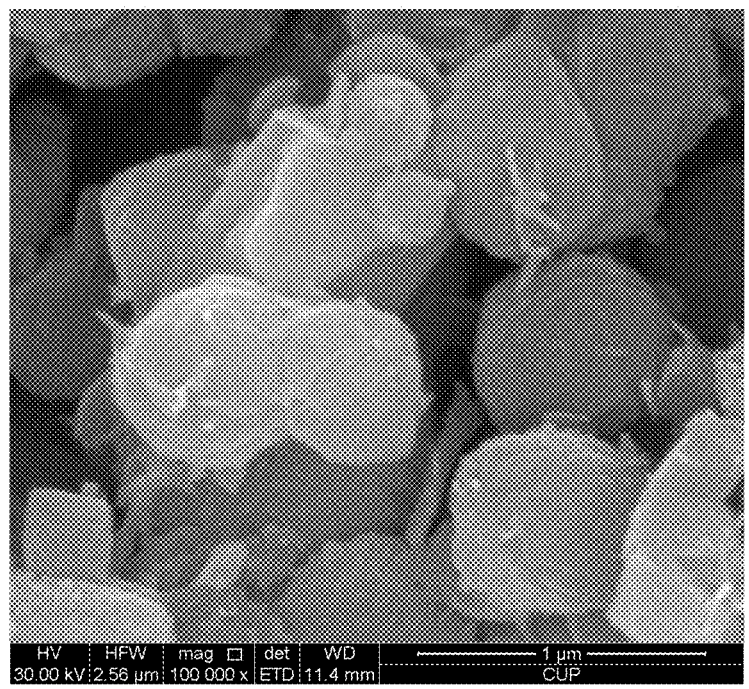
FIG. 10 is a scanning electron microscope (SEM) image magnified by 100,000 times of the Beta molecular sieve obtained in Example 5 of the present invention.

Preparation of the molecular sieve: 8.59 g of the calcined diatomite powder was weighed, and 43.76 g of tetraethylammonium hydroxide, 20.64 g of deionized water, 0.33 g of potassium chloride, and 3.22 g of the activated kaolin powder were added, such that the molar ratio satisfies: 0.16 $Na_2O$:0.015 $K_2O$:0.25 $(TEA)_2O$:1 $SiO_2$:0.05 $Al_2O_3$:20 $H_2O$. After mixing uniformly, this mixture was poured into a Teflon-lined stainless steel crystallization vessel, heated to 140° C., and left to crystallization for 72 h. After the completion of crystallization, the mixture was cooled and the mother liquor was removed by filtration, and the resultant was washed to neutral, and dried at 120° C., to obtain a crystallized product. The physical phase of the product was identified by XRD characterization as a Beta molecular sieve. In the product, the Beta molecular sieve had a relative crystallinity of 78%, a grain size of 300 to 500 nm, a silica-to-alumina ratio of 19.0, an XRD spectrum as shown in FIG. 9, and a SEM image as shown in FIG. 10.

What is claimed is:
1. A preparation method of Beta molecular sieve, characterized in that, the method comprises the following steps:
   (1) activation of minerals: activating a mineral having a low silica-to-alumina ratio and a mineral having a high silica-to-alumina ratio, respectively, wherein the mineral having a low silica-to-alumina ratio is activated via a sub-molten salt medium, and the mineral having a high silica-to-alumina ratio is subjected to thermal activation treatment by means of high-temperature calcination;
   (2) crystallization: mixing the mineral having a low silica-to-alumina ratio and the mineral having a high silica-to-alumina ratio, which have been activated in Step (1), with sodium chloride, potassium chloride, water and a template agent for hydrothermal crystallization, and controlling charged amounts of the respective raw materials such that the molar ratio satisfies: 0.03-0.18 $Na_2O$:0.01-0.03 $K_2O$: 0.1-0.4 $(TEA)_2O$: 1 $SiO_2$: 0.01 -0.5 $Al_2O_3$: 12-40 $H_2O$; cooling the crystallized product, removing the mother liquor by filtration, washing the resulting filter cake with water to neutral and drying it to obtain the Beta molecular sieve.
2. The preparation method according to claim 1, wherein the mineral having a low silica-to-alumina ratio has a silica-to-alumina molar ratio of 10 or less, and the mineral having a high silica-to-alumina ratio has a silica-to-alumina molar ratio of 30 or more.

3. The preparation method according to claim 1, wherein the mineral having a low silica-to-alumina ratio is kaolin and/or rectorite; and the mineral having a high silica-to-alumina ratio is diatomite.

4. The preparation method according to claim 1, wherein the activation of the mineral having a low silica-to-alumina ratio with a sub-molten salt medium in Step (1) comprises mixing uniformly the mineral having a low silica-to-alumina ratio with an alkali metal hydroxide and water prior to drying.

5. The preparation method according to claim 4, wherein the alkali metal hydroxide is sodium hydroxide, the mass ratio of the mineral having a low silica-to-alumina ratio to the total weight of sodium hydroxide and water is 1:1-10, the mass ratio of sodium hydroxide to water is from 2:1 to 1:5, and the drying temperature is from 100° C. to 400° C.

6. The preparation method according to claim 1, wherein, in Step (1), the mineral having a high silica-to-alumina ratio has a calcination temperature of 600° C. to 1000° C., and a calcination time of 1 to 10 hours.

7. The preparation method according to claim 1, wherein, in Step (2), the template agent is tetraethylammonium hydroxide, tetraethylammonium bromide or a combination thereof.

8. The preparation method according to claim 1, wherein, in Step (2), the crystallization is carried out at 130° C. to 160° C. for 24 to 72 hours.

* * * * *